(12) United States Patent
Gouthama et al.

(10) Patent No.: US 7,720,474 B2
(45) Date of Patent: May 18, 2010

(54) METHOD AND APPARATUS FOR CALL DELIVERY

(75) Inventors: Sudha Gouthama, Glendale Heights, IL (US); Robin J. Thompson, Batavia, IL (US); Mark A. Ristich, Naperville, IL (US); Angelica T. Remoquillo, Naperville, IL (US); Suzann Hua, Lisle, IL (US); E-Ling Lou, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 519 days.

(21) Appl. No.: 11/405,745

(22) Filed: Apr. 18, 2006

(65) Prior Publication Data

US 2007/0243875 A1    Oct. 18, 2007

(51) Int. Cl.
*H04W 4/00*    (2009.01)

(52) U.S. Cl. .................. 455/433; 455/422.1; 455/432.1; 455/435.1; 455/413

(58) Field of Classification Search ................ 455/433, 455/422.1, 432.1, 435.1, 413
See application file for complete search history.

(56) References Cited

U.S. PATENT DOCUMENTS

| | | | |
|---|---|---|---|
| 5,734,700 A * | 3/1998 | Hauser et al. ............... 455/413 |
| 6,195,555 B1 * | 2/2001 | Dent ........................ 455/456.2 |
| 7,120,469 B1 * | 10/2006 | Urakawa ..................... 455/564 |
| 2001/0051518 A1 | 12/2001 | Lee |
| 2002/0077089 A1 * | 6/2002 | Contreras .................... 455/415 |
| 2002/0123333 A1 * | 9/2002 | Sato .......................... 455/415 |
| 2003/0046081 A1 * | 3/2003 | Koo et al. ................... 704/270 |
| 2005/0070278 A1 * | 3/2005 | Jiang ....................... 455/432.3 |
| 2005/0170837 A1 * | 8/2005 | Halsell ....................... 455/445 |
| 2005/0192035 A1 * | 9/2005 | Jiang ......................... 455/461 |
| 2006/0025131 A1 | 2/2006 | Adamany et al. |
| 2006/0052101 A1 | 3/2006 | Zhou |
| 2006/0240822 A1 * | 10/2006 | Jiang ......................... 455/433 |
| 2006/0252424 A1 * | 11/2006 | Ohno et al. ............... 455/432.1 |
| 2006/0281492 A1 * | 12/2006 | Jiang ......................... 455/558 |
| 2007/0003048 A1 * | 1/2007 | Starling et al. .............. 379/219 |

\* cited by examiner

*Primary Examiner*—Joseph H Feild
*Assistant Examiner*—Huy D Nguyen
(74) *Attorney, Agent, or Firm*—Fay Sharpe LLP

(57) ABSTRACT

A method and system for forwarding calls in telecommunication networks are provided. More particularly, control of late call forwarding logic and routing is placed at the home network Gateway MSC and HLR, thus removing the home network service provider's dependency on the visited network capabilities.

10 Claims, 3 Drawing Sheets

METHOD AND APPARATUS FOR CALL DELIVERY

BACKGROUND OF THE INVENTION

The present invention relates to the telecommunication arts. It finds particular application in conjunction with wireless networks, and it will be described with particular reference thereto. However, it is to be appreciated that the present invention is also amenable to other like applications.

By way of background, wireless telecommunication networks, which are well known, allow mobile devices to communicate with each other and other networks, such as the Internet and the Public Switched Telephone Network (PSTN). For example, the Global System for Mobility (GSM) is a global standard based on TDMA (Time Division Multiple Access). GSM networks deployed in Europe and throughout the world utilize a protocol called the GSM Mobile Application Part (MAP), standardized by the European Telecommunications Standards Institute (ETSI). Other TDMA-based networks and CDMA networks utilize a protocol called ANSI-41, a protocol standardized by the Telecommunications Industry Association (TIA) and the American Standards Institute (ANSI).

When the user of a mobile device is "roaming" in a network other than their own home network, calls are initially routed to a Gateway Mobile Switching Center and then to a Visited Mobile Switching Center. If the mobile user does not answer the call or is busy, then the call is forwarded (called "late" or "conditional" call forwarding)—usually to the mobile user's voicemail system located in the home network. This results in a voice circuit from the home network/Gateway Mobile Switching Center to the Visited Mobile Switching Center and back to the home network voicemail system. This is sometimes called "tromboning the call." This is especially problematic if this user is roaming internationally, where a tromboned call might traverse much of the globe in two directions. This results in extra costs, use of facilities, and degradation of voice quality, among other things.

The GSM MAP standard, for example, allows MAP messages to be used to optimally route the call, thus eliminating the out and back loop. However, many visited systems in the world do not support late call forwarding optimal routing. Further, the home network service provider who bears the cost for this "tromboned" call has no direct control on the capabilities of the Mobile Switching Centers in the visited network and cannot solve this problem via an upgrade to a system that supports the optimal routing function in the standards.

Accordingly, the present invention contemplates a new and improved method and apparatus that resolves the above-referenced difficulties and others.

SUMMARY OF THE INVENTION

A method and system for forwarding calls in telecommunication networks are provided. More particularly, control of late call forwarding logic and routing is placed at the home network Gateway MSC and HLR, thus removing the home network service provider's dependency on the visited network capabilities.

In accordance with an aspect of the present invention, a method of routing calls in a communication network is provided. The method comprises: receiving a call from a calling party directed to a subscriber at a first network entity; obtaining call routing information for the subscriber from a database and starting an answer timer; determining the current location of the subscriber; connecting the call to a second network entity servicing the subscriber; receiving an indication that the subscriber has not answered; releasing the connection to the second network entity; obtaining late call forwarding information for the subscriber from the database; and completing the call to a late call forwarding destination based on the late call forwarding information.

In accordance with another aspect of the present invention, a subscriber registration method in a communication network is provided. The method comprises: receiving a request from a visited mobile switching center for a subscriber's call routing information; obtaining the subscriber's call routing information from a subscriber database; and sending the subscriber's call routing information to the visited mobile switching center, wherein the subscriber's call routing information does not include call forwarding features or destination information for the subscriber.

In accordance with yet another aspect of the present invention, a system for routing calls in a communication network is provided. The system comprises: a database for storing subscriber profile information and a gateway mobile switching center. The mobile switching center is operative to: receive a call from a calling party directed to a subscriber; obtain call routing information for the subscriber from the database and start an answer timer; determine the current location of the subscriber; connect the call to a visited mobile switching center servicing the subscriber; receive an indication that the subscriber has not answered; release the connection to the visited mobile switching center; obtain late call forwarding information for the subscriber from the database; and complete the call to a late call forwarding destination based on the late call forwarding information.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION

Figure 1:
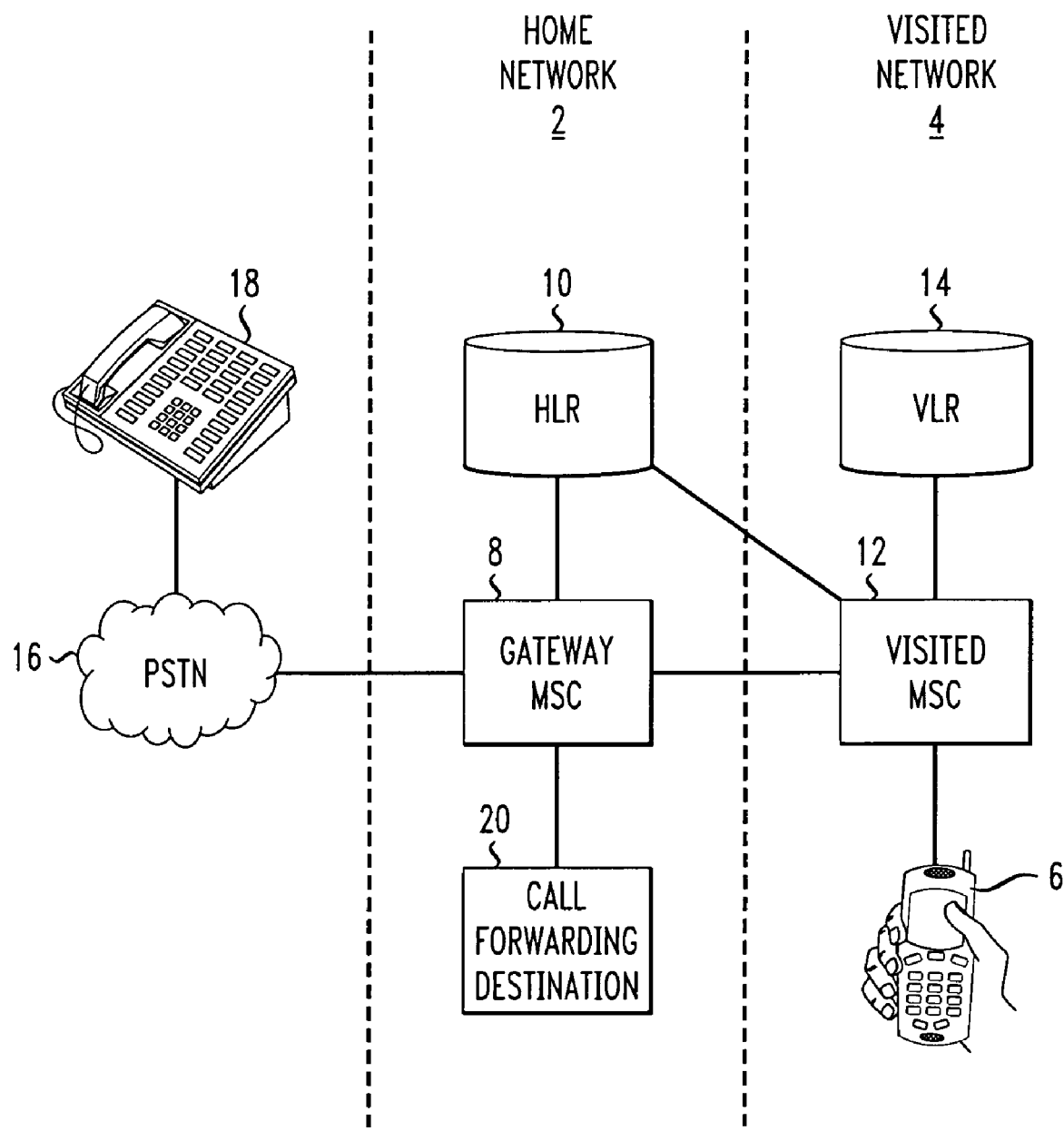
FIG. 1 illustrates a schematic diagram of a mobile communication system suitable for implementing aspects of the present invention.

Referring now to the drawings wherein the showings are for purposes of illustrating the exemplary embodiments only and not for purposes of limiting the claimed subject matter, FIG. 1 provides a view of a system into which the presently described embodiments may be incorporated. As shown generally, FIG. 1 represents a known mobile communication system and includes at least two networks, in this case, a Home Network 2 and a Visited Network 4 for a subscriber's mobile device 6. The Home Network 2 includes a Gateway Mobile Switching Center 8 and a Home Location Register 10. The Visited Network 4 includes a Visited Mobile Switching Center 12 and a Visited Location Register 14. The exemplary embodiments of the present invention are generally employed with wireless units such as cellular telephones and personal communication service (PCS) units that operate under the standards of Advanced Mobile Phone Service (AMPS), Call Division Multiple Access (CDMA), or Time Division Multiple Access (TDMA). Nonetheless, the principles of the present invention may be applied to other communication devices operating under other standards with the appropriate reconfiguration.

A Mobile Switching Center or MSC is a telephone exchange that provides circuit-switched calling, mobility management, and other services to the mobile phones roaming within the area that it serves. This refers to voice, data and fax services, as well as SMS and call diversion.

The Gateway MSC 8 is the MSC that routes the call to the visited MSC on which the subscriber who is being called is currently located. It also interfaces with the Public Switched Telephone Network (or PSTN) 16. Thus, a call from a calling party 18, whether it is a mobile-to-mobile call or a PSTN-to-mobile call, is generally routed through the Gateway MSC 8. In this example, the calling party 18 is represented by an ordinary wireline telephone, which is operatively connected to the Gateway MSC 8 via the PSTN 16. It is to be understood, however, that the calling party 18 could be using any other type of communication device, including a mobile phone.

The term is only valid in the context of one call since any MSC may provide both the gateway function and the visited MSC function. The Gateway MSC 8 is also linked to one or more call forwarding destinations 20 for the subscriber, such as a voice mail server.

The Home Location Register or HLR 10 is a central database that contains details of each mobile phone subscriber that is authorized to use the GSM core network. Several important items of data associated with the HLR 10 are the telephone numbers used to make and receive calls to the mobile device 6, known as MSISDNs. The main MSISDN is the number used for making and receiving voice calls and SMS, but it is possible for other secondary MSISDNs to be included for fax and data calls. Each MSISDN is also a primary key to the HLR record. Examples of other data stored in the HLR 6 include the current location of the subscriber and call diversion settings applicable for each associated MSISDN.

The Visited MSC 12 is the MSC where a subscriber is currently located. The subscriber could be roaming in the United States or internationally. The Visitor Location Register or VLR 14 is a temporary database of the subscribers who have roamed into the particular area which it serves. Each Base Station in a given network is served by exactly one VLR; thus, a subscriber cannot be present in more than one VLR at a time. The VLR 14 stores, among other things, the HLR address of the subscriber.

GSM MAP and ANSI-41 are examples of protocols that utilize a signaling protocol called SS7 (Signaling System No. Seven) to allow roaming as well as more advanced capabilities. Communication between the VLR 8 in the visited network and the HLR 10 of the Home Network 2 is facilitated by these mobile networking protocols and signaling based on SS7.

In GSM networks, for example, the MAP rides on top of SS7, allowing the VLR-to-HLR (and HLR-to-VLR) communications. In non-GSM networks (such as many of those found in the United States), ANSI-41 is deployed (which also uses SS7) for HLR/VLR communications.

Visited Network Registration

The mobile device 6 is particularly useful when the subscriber is on the move such as when the subscriber is driving a car. The subscriber's mobility may take the subscriber out of the service area served by the network service provider from whom the subscriber subscribes. The subscriber may move so as to be located in another service area that is served by a different network service provider with whom the subscriber has no direct business relationship. The subscriber is said to be "roaming" out of his or her home service area and may be referred to as a "roamer," or "roaming subscriber" in a visited service area that is served by a visited network. As stated earlier, the subscriber could be roaming in the United States or internationally. To provide a roaming subscriber with communications service, service providers have agreed to follow certain procedures in the processing of communications with respect to each other's subscribers. Generally, a roaming subscriber is validated and may be authenticated by the Visited Network 4, which also may be referred to as the visited network service provider.

In accordance with the present invention, late call forwarding is to be controlled at exactly one node in the network (i.e., the Gateway MSC 8); therefore, the HLR 10 must indicate through the Visited Network 4 that late call forwarding features should not be applied to certain subscribers. Specifically, when the feature information for each subscriber is provided by the HLR 10 to the Visited MSC 12, the late call forwarding features must not be included as features assigned to the subscriber. The new visited network registration process will be described in greater detail below.

Figure 2:
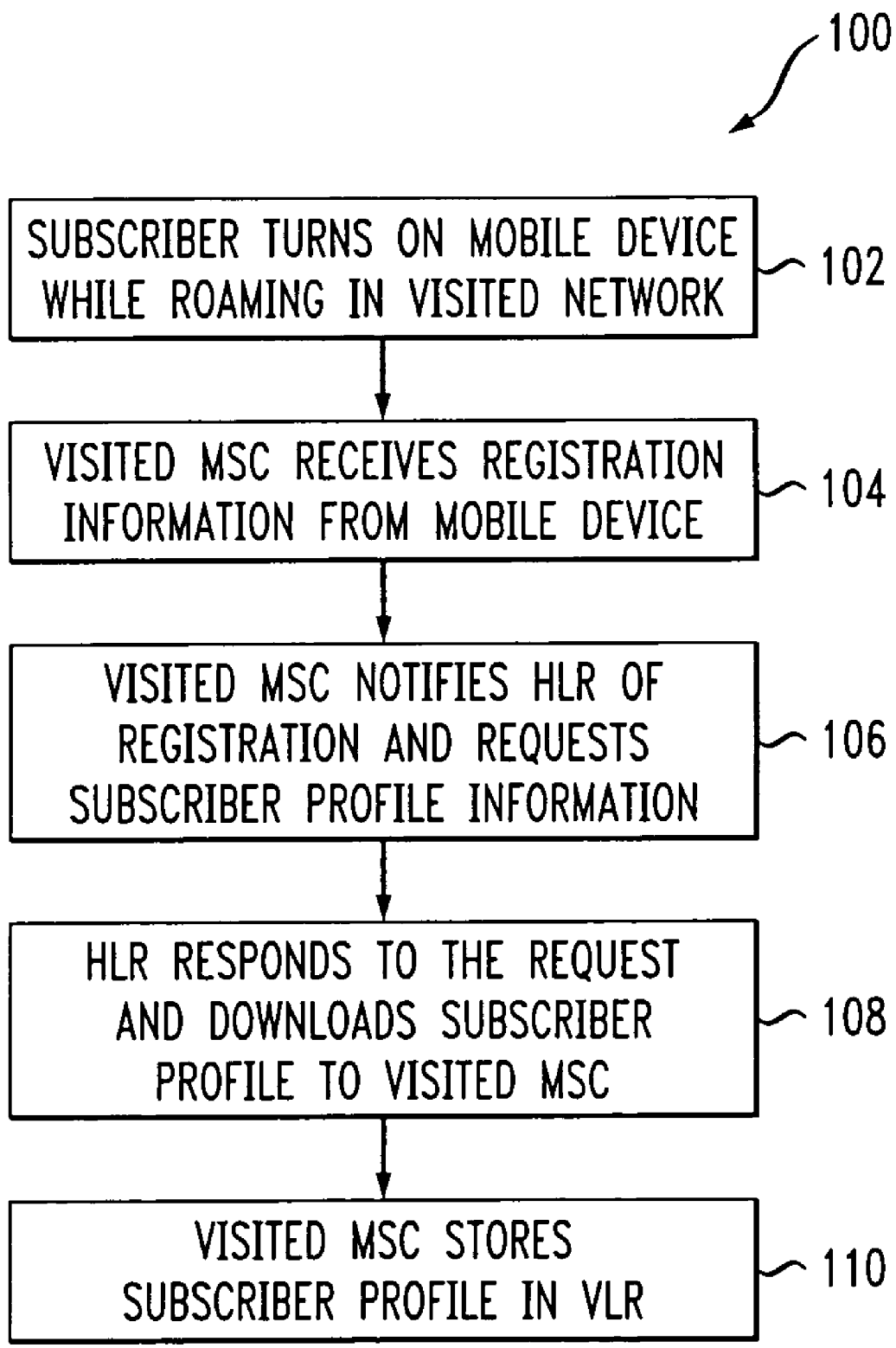
FIG. 2 illustrates a diagram of a visited network registration process in accordance with aspects of the present invention.

Prior to being provided with communications service in the Visited Network 4, the mobile device 6 typically needs to be registered in the Visited Network 4. To register the mobile device 6 in the Visited Network 4, the Visited MSC 12 takes certain steps. With reference now to FIG. 2, a visited system registration process 100 in accordance with the present invention will be described.

Initially, the subscriber turns on the mobile device 6 while roaming in the Visited Network 4 (102). The Visited MSC 12 receives registration information from the mobile device 6 (104). Using the mobile device's identification (which generally may include its mobile number, and electronic serial number (ESN), and/or mobile identification number (MIN), if different from the mobile number), the Visited MSC 12 sends a message to the HLR 10 of the Home Network 2, which generally provides wireless communications service to the subscriber (106). That is, the Visited MSC 12 notifies the HLR 10 of registration and requests subscriber profile information. Assuming the mobile device 6 is valid, the HLR 10 responds to the request from the Visited MSC 12 and downloads the subscriber profile (108). The HLR 10 generally keeps track of the information about the location of the subscriber in a visited system for use in the future routing of calls, etc. In this case, the HLR 10 determines if late or conditional call forwarding at the Gateway MSC 8 should be supported (e.g., if the visited system does not support optimal routing), and, if so, the subscriber profile does not include call forwarding features or destination information.

Once the Visited MSC 12 receives the subscriber profile, any communication initiated by the visiting mobile device 6 may be processed. The VLR 14 may then temporarily store the downloaded subscriber profile (110).

Registration generally is the mechanism for providing information to the subscriber's home network with respect to the subscriber's location in the Visited Network 4. With this location information, the Home Network 2 then may process calls that are received for the roaming subscriber. In particular, when the Home Network 2 receives a call for its subscriber, the Gateway MSC 8 checks its HLR 10 to determine if the mobile device 6 is operating in the geographic area of the Home Network 2. The Gateway MSC 8 may find that the mobile device 6 is not located in the geographic area of the Home Network 2, but rather, is roaming in a visited network. If so, the Gateway MSC 8 sends a request to the Visited MSC 12 via the HLR 10 for information that will help the Gateway MSC 8 in routing the call to the subscriber.

Call Delivery

Figure 3:
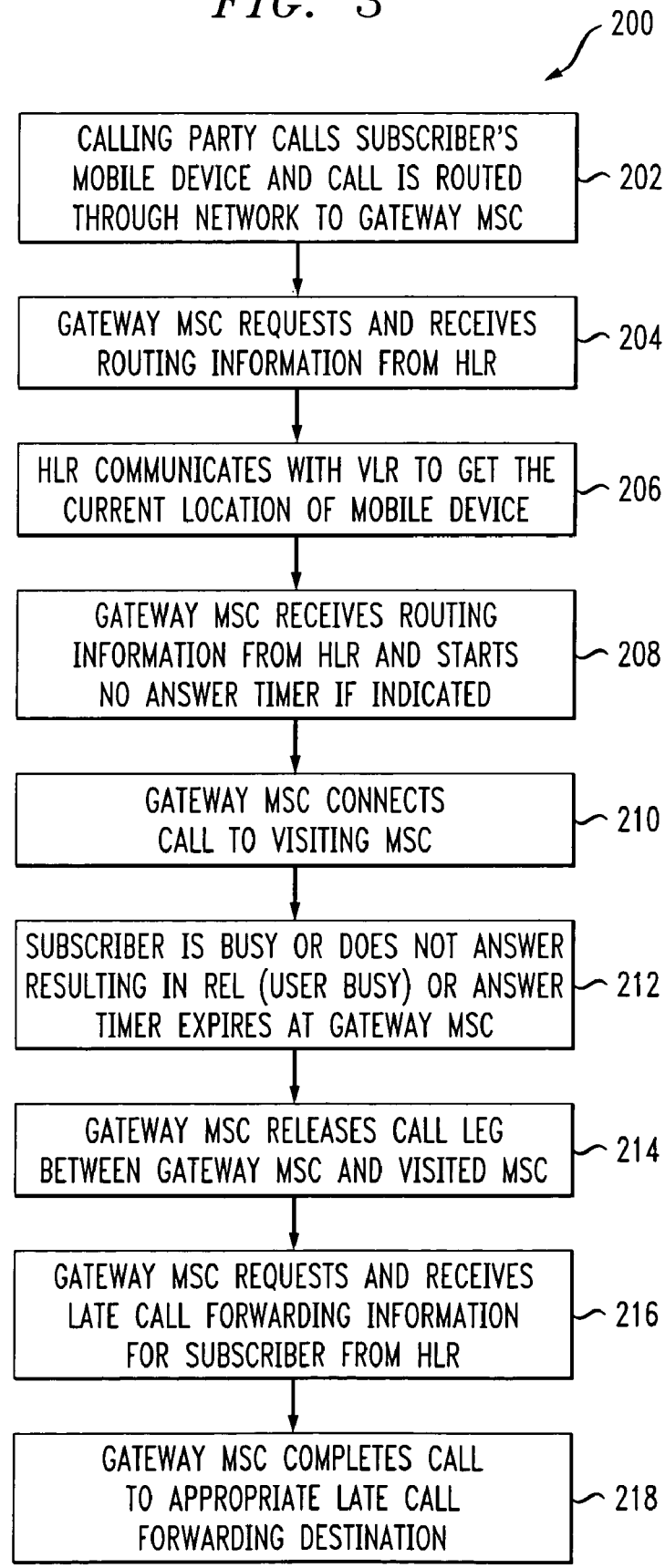
FIG. 3 illustrates a diagram of a call delivery process in accordance with aspects of the present invention.

With reference now to FIG. 3, a call delivery process 200 in accordance with the present invention will be described.

When the calling party 18 places a call to the mobile device 6, they typically dial the telephone number associated with the mobile device 6, and the call is then routed to the Gateway MSC 8 (202). The Gateway MSC 8 acts as the entry point from exterior portions of the PSTN 16 onto the provider's network.

Of course, the subscriber is free to roam anywhere in the operator's network or on the networks of roaming partners, including in other countries. So, the first job of the Gateway MSC 8 is to determine the current location of the mobile device 6 in order to connect the call. It does this by consulting the HLR 10, which is aware of the VLR 14 the mobile device 6 is associated with, if any (204). The Gateway MSC 8 also runs a no reply (or no answer) timer for each call routed to the subscriber if the Gateway MSC implementation of late call forwarding is indicated for this call.

When the HLR 10 receives this query message, it determines how to route the call to the mobile device 6 (206). The Gateway MSC 8 receives routing information from the HLR 10 and starts the no answer timer if indicated (208). Further, if the HLR 10 is aware that the mobile device 6 of the subscriber is in the jurisdiction of a particular VLR (such as the VLR 14 of the Visited Network 4), then it will request a temporary number (MSRN) from that VLR. This number is relayed to the Gateway MSC 8, which uses it to route the call to a Visited MSC 12 (210).

When the call is received by the Visited MSC 12, the MSRN is used to find the mobile device's record in the VLR 14. This record identifies the location area of the mobile device 6. Paging occurs to all mobile phone masts in that area. When the subscriber's mobile device 6 responds, the exact location of the mobile device 6 is returned to the Visited MSC 12. The Visited MSC 12 then forwards the call to the appropriate phone mast, and the phone rings. If the subscriber answers, a speech path is created through the Visited MSC 12 and Gateway MSC 8 back to the network of the calling party 18, and a normal telephone call follows.

Of course, it is also possible that the phone call is not answered. That is, the subscriber may be busy on another call (and call waiting is not being used) or the subscriber simply does not answer the call after a pre-determined period of time (e.g., 30 seconds) (212). Thus, if the answer timer expires or if an ISUP REL (Release) with indication that subscriber is busy or not reachable is received, the Gateway MSC 8 releases the call leg between the Gateway MSC 8 and the Visited MSC 12 (214). The Gateway MSC 8 then queries the HLR 10 for late call forwarding information for the subscriber via GSM MAP AnyTimeSubscriptionInterrogation (ATSI) or ANSI-41 MAP TransferToNumberRequest for the appropriate no reply, not reachable or busy condition (216). The Visited MSC 12 then routes the call to a late call forwarding destination 20 such as a pre-determined Call Forward Busy number or to a voice mail system in the home network 2 so that the calling party 18 can leave a message (218). This process is called "late" or "conditional" call forwarding. The result is a voice circuit from the Gateway MSC 8 directly to a late call forwarding destination 20, such as a voice mail system in the Home Network 2.

The invention can be applied to all or only a subset of users on the Gateway MSC 8, but applying only to a subset of users requires that the Gateway MSC 8 has per user information to indicate that this service applies. This information could be programmed at the Gateway MSC 8 or provided by the HLR 10 when the Gateway MSC 8 requests routing information for each call, i.e., in the SendRoutingInformation return result sent from the HLR 10 to the Gateway MSC 8 on each incoming call attempt.

Further, the solution could be applied for all calls to those users or only on calls to certain roaming partner systems or international destinations. For example, the home network service provider may decide to provide the Gateway MSC 8 based late call forwarding only when the user is roaming internationally. In that case, the HLR 10 must provide the user profile feature list without late call forwarding to the international partners and include the late call forwarding features in the user profile feature list for national partners. In addition, the Gateway MSC 8 must determine if the call is being routed to an international or a national visited system (for example, based on a late call forwarding at Gateway MSC 8 feature indication in the SendRoutingInformation return result from the HLR 10 or via the country code in the mobile station routing number—MSRN—used to route to the Visited Network 4 and apply the late call forwarding features only if appropriate).

Additionally, the Gateway MSC 8 described herein could be a circuit network Gateway MSC, a SoftSwitch Gateway MSC or an IMS-based Gateway MSC application server.

It is noted that the above detailed description is represented largely in terms of processes and symbolic representations of operations performed by conventional computer components, including a central processing unit (CPU), memory storage devices for the CPU, and connected display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of routing calls in a communication network, the method comprising:
   receiving a call from a calling party directed to a roaming subscriber at a first network entity in the subscriber's home network;
   obtaining call routing information for the subscriber from a database in the subscriber's home network and starting an answer timer;
   determining the current location of the subscriber;
   connecting the call to a second network entity servicing the subscriber in a visited network;
   upon receiving an indication that the subscriber has not answered the call, releasing the connection to the second network entity;
   obtaining late call forwarding information for the subscriber from the database; and
   completing the call to a late call forwarding destination in the home network based on the late call forwarding information.

2. The method defined in claim 1, wherein the indication that the subscriber has not answered comprises a user busy message or an answer timer expiration message.

3. The method defined in claim 1, wherein the first network entity comprises a gateway mobile switching center and the second network entity comprises a visited mobile switching center.

4. The method defined in claim 1, wherein the late call forwarding destination comprises a voicemail system or other pre-determined call forward number.

5. A subscriber registration method in a communication network, the method comprising:
   receiving a request from a visited mobile switching center for a roaming subscriber's call routing information;
   obtaining the subscriber's call routing information from a subscriber database located in the subscriber's home network, wherein the subscriber's call routing information and the subscriber's late call forwarding information are stored in the subscriber database; and
   sending the subscriber's call routing information to the visited mobile switching center, wherein the subscriber's call routing information does not include late call forwarding features or destination information for the subscriber.

6. The method defined in claim 5, further comprising:
   determining whether the subscriber is roaming internationally or in the United States; and
   controlling late call forwarding at exactly one node in the communication network, wherein a home location register indicates through a visited network that late call forwarding features should not be applied to certain subscribers.

7. A system for routing calls in a communication network, the system comprising:
   a database for storing subscriber profile information; and
   a gateway mobile switching center, wherein the mobile switching center is operative to:
      receive a call from a calling party directed to a roaming subscriber in the subscriber's home network;
      obtain call routing information for the subscriber from the database and start an answer timer in the subscriber's home network;
      determine the current location of the subscriber;
      connect the call to a visited mobile switching center servicing the subscriber in a visited network;
      upon receipt of an indication that the subscriber has not answered the call, release the connection to the visited mobile switching center;
      obtain late call forwarding information for the subscriber from the database; and
      complete the call to a late call forwarding destination in the home network based on the late call forwarding information.

8. The system defined in claim 7, wherein the indication that the subscriber has not answered comprises a user busy message or an answer timer expiration message.

9. The system defined in claim 7, wherein the gateway mobile switching center is further operative to:
   receive a request from a visited mobile switching center for the subscriber's call routing information;
   obtain the subscriber's call routing information from the subscriber database; and
   send the subscriber's call routing information to the visited mobile switching center, wherein the subscriber's call routing information does not include call forwarding features or destination information for the subscriber.

10. The method defined in claim 7, wherein the late call forwarding destination comprises a voicemail system or a pre-determined call forward busy number.

* * * * *